(12) United States Patent
Beukema

(10) Patent No.: US 6,219,356 B1
(45) Date of Patent: Apr. 17, 2001

(54) METHOD FOR MULTIPATH RESISTANT WAVEFORM CODING FOR HIGH SPEED WIRELESS DATA TRANSMISSION

(75) Inventor: Troy James Beukema, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/965,895

(22) Filed: Nov. 7, 1997

(51) Int. Cl.$^7$ ....................................................... H04J 3/06
(52) U.S. Cl. .............................................. 370/516; 455/65
(58) Field of Search ...................................... 370/203, 204, 370/208, 206, 207, 200, 310, 516, 517, 335, 342; 375/200, 285, 219, 220, 298, 340; 455/65

(56) References Cited

U.S. PATENT DOCUMENTS 5,790,537 * 8/1998 Yoon et al. ........................... 370/342
6,049,535 * 4/2000 Ozukturk et al. ..................... 370/335

OTHER PUBLICATIONS

Andren, Carl, brochure entitled "High Data Rate Radio Architecture", Sep. 15, 1997.

Sklar, Bernard, "Digital Communications: Fundamentals and Applications", Prentice Hall, pp. 245–256, 1988.

* cited by examiner

Primary Examiner—Huy D. Vu
(74) Attorney, Agent, or Firm—F. Chau & Associates, LLP

(57) ABSTRACT

A method for multipath resistant waveform coding is provided. The method adds a chip extension to an optimally designed waveform set to compensate for an expected time shift in the radio channel during the transmission and demodulation of the transmitted waveform. The chip extension can be added to the beginning and/or end of the input waveform. The number of chip extensions added is based on the expected multipath time delay in the radio channel. The chip extension method can be used in BPSK, QPSK, QBPSK, and a modified Quadrature-BPSK encoding scheme.

9 Claims, 8 Drawing Sheets

EXAMPLE 1: N=8,B=1,E=1

EXAMPLE 2: N=8,B=2,E=1

EXAMPLE 3: N=8,B=2,E=2

BPSK Waveform Encoding

QPSK Waveform Encoding

OQBPSK Waveform Encoding

NOTE: ALL VECTORS IN "I" CHANNEL WAVEFORM SET $W_1$ THROUGH $W_{M/2}$ ARE ORTHOGONAL TO ALL VECTORS IN "Q" CHANNEL WAVEFORM SET $W_{M/2+1}$ THROUGH $W_M$

METHOD FOR MULTIPATH RESISTANT WAVEFORM CODING FOR HIGH SPEED WIRELESS DATA TRANSMISSION

BACKGROUND OF THE INVENTION

1. Field of the Invention

The present invention relates to data transmission. More particularly, it relates to a multipath resistant waveform coding method for the wireless transmission of data.

2. Prior Art

The need for high speed wireless data transmission as a core technology for such market segments as wireless Local Area Networks (LAN) and wireless home networking is increasing. This newly emerging interest is new high speed technology has been fueled by the opening of new unlicensed radio spectrum in the Industrial, Scientific, and Medical (ISM) bands (900 MHz, 2.4 GHz, 5.7 GHz).

Waveform coded modulations are well known, and have been used to achieve high data rate radio links in other known commercial radio products in the 2.4 GHz ISM band. However, in indoor environments, a large number of multiple signal reflections occur when using wireless communication systems. These signal reflections result in a smearing of the signal in time (time dispersion) and "self-jamming". This can adversely impact the performance of a straightforward waveform coding system.

The basic concept behind waveform coding is diagrammed in FIG. 1. As shown, the baseband modulation stream s(t) comprises sequentially transmitted waveforms selected from the set $[w_1(t), w_2(t) \ldots w_M(t)]$, each of which represents a bit pattern (or waveform vector) which is selected by the input data to be encoded. In binary waveform coding, the waveform is formed from a sequence of N individual "chip" values which can take on (unfiltered) values of ±1. Typically, the waveform sequences are chosen from a fixed set of orthogonal sequences. For an orthogonal waveform set, $$\int w_m(t)w_n(t)dt=0, m\neq n \quad (1)$$

$$\int w_m(t)w_n(t)dt=K, m=n \quad (2)$$

where the range of integration is equal to the time duration of the waveform ("T" in FIG. 1) and K represents a positive value, not necessarily the same for different waveforms in the set. The waveform set may also be "near-orthogonal". For a "near-orthogonal" waveform set, $$\int w_m(t)w_n(t)dt=K1, m\neq n \quad (3)$$

$$\int w_m(t)w_n(t)dt=K, m=n \quad (4)$$

where K>>K1 for all different combinations of waveforms. To decode waveform coding modulation, the waveform interval in the received signal s(t) is processed using a correlator structure which evaluates correlations $c_1$ through $c_M$, where M is the number of possible transmitted waveforms. Since the basis waveforms $\vec{w}_1$ through $\vec{w}_M$ normally represent an orthogonal or near-orthogonal basis set, all of these correlations will result in a value of low correlation except for one, which provides a relatively larger correlation. The bit pattern which corresponds to the basis waveform "w" giving the largest correlation at the receiver is taken as the estimate of the information encoded at the transmitter. The baseband waveform shape is shown here as a perfect square wave for exemplary purposes only, and in practice will be smoothed with a band limiting filter so that it does not interfere with other possible users in the frequency domain.

This basic concept can be described mathematically by representing time waveforms as a discrete vector of N "chip" values, which can assume a value of 1 or −1. For example, a length N waveform "w" is represented as the vector:

$$\vec{w} = [w(0), w(1), \ldots w(N-1)]$$

where w(0), ... w(N−1) are "chip" values of 1 or −1.

If a length N waveform is chosen, then b=floor($\log_2(N)$) bits can be encoded to select 1 of $M=2^b$ waveforms for transmission. At the receiver, a maximum likelihood correlator correlates the received vector against all possible transmitted waveforms, and selects the waveform with the highest correlation as the transmitted waveform. The receiver correlation computes:

$$c_n = \sum_{i}^{N-1} w_n(i)s(i) \quad (6)$$

for each of the M possible different transmitted waveforms, where "$w_n$" represents the waveform being correlated and "s" represents the received signal vector. The maximum $c_n$ value corresponds to the most likely transmitted waveform, and the output bits are those used to encode that waveform pattern at the transmitter.

In order to assure optimal performance, the set of M transmitted waveforms should be as orthogonal as possible. That is, the correlation value computed by (5) should be small or zero for all waveform vectors except for the transmitted one, which will output a large value.

Several encoding methods can be used to map data bits to waveform patterns. Examples of these methods are: Binary Phase Shift Keying (BPSK), Quadrature Phase Shift Keying (QPSK), and Quadrature BPSK (QBPSK).

BPSK/QPSK Waveform Encoding

In BPSK encoding as shown in FIG. 10, b+1 bits will be encoded per waveform by applying a sign multiplier value of 1 or −1 to each "chip" in the waveforms. At the receiver, the sign bit is decoded either coherently or differentially using known, common techniques. The transmitter puts the same waveform on both the I and Q channels of the carrier as follows:

$$s = sign * (\vec{w} + \vec{jw})$$

where sign is a ±1 multiplier based on the sign bit value, and $$\vec{w}$$

is the waveform selected by the "b" input data bits, and "j" is the square root of −1.

In QPSK encoding as shown in FIG. 11, it is possible to encode b+2 bits per waveform in a radio channel, by applying a "complex sign" multiplier of 1+j0, 0+j1, or 0−j1 to the waveform. At the receiver, this "complex" sign, which can be viewed as a waveform phase, is decoded using either coherent or differential techniques. In this case, 2 bits are used to select one of four possible waveform phases. The resulting transmit waveform is:

$$s = qsign * (\vec{w} + \vec{jw})$$

where qsign takes on a value of (1, j, −1, or −j).

The BPSK/QPSK decoder looks for the maximum magnitude of the complex correlation of all M waveforms. The waveform index 0 . . . M−1 which corresponds to the maximum value is used as an index to look up the transmit bits which are associated with the waveform (normally, the value of 0 . . . M−1 itself can be used). The sign bit(s) is (are) decoded using well known differential or coherent decoding techniques.

Quadrature BPSK (QBPSK) Waveform Encoding

In QBPSK encoding as shown in FIG. 12, to increase the encoded bits per unit waveform time to 2*(b+1), it is possible to encode two separate waveforms independently on the I and Q axes of the modulation. This allows twice the data rate to be packed into the same bandwidth, but gives up multipath rejection performance since multipath crosstalk will occur between the I and Q channels in the receiver. In addition, this encoding algorithm requires a coherent phase reference at the receiver, (i.e., it cannot be decoded non-coherently). This can increase receiver complexity.

The transmit waveform is:

$$s = sign1 * \vec{w1} + j(sign2 + \vec{w2})$$

where sign 1, sign 2 and $$\vec{w1}, \vec{w2}$$

are two independently coded sign bits and waveforms.

As stated above, the QBPSK decoder must use a coherent architecture, which mixes the received waveforms to 0 phase offset with respect to the transmitted I and Q axes. The QBPSK decoder correlates against all M possible transmitted waveforms in one block. Then, the maximum absolute value of the real part of the complex correlations is found. The sign bit information for the I channel is derived from the sign of the maximum real value. The Q channel information is decoded in a similar manner, by looking for the maximum absolute value of the imaginary part of the M complex correlations and the associated sign of this value.

SUMMARY OF THE INVENTION

The present invention provides a waveform coding system using a set of optimized waveforms and an extension of the basic waveform coding principle to build in more multipath resistance tolerance. The proposed method eliminates a large amount of self jamming power, thereby increasing system reliability and coverage range, particularly in an indoor environment.

According to an illustrative embodiment of the invention, a transmitted waveform is augmented at the transmitter end with information designed to preserve the autocorrelation properties of the waveform. In one embodiment, the augmentation is an extension of the waveform. In another embodiment, information is appended to the front and/or rear end of the waveform. The received waveform is then correlated or integrated by the receiver such that only the inner portion of the waveform is matched to the transmitted waveform.

The augmentation or extension of the waveform reduces the distortion generated as a result of the multipath ray being summed into the dominant ray, and results in increased multipath tolerance.

The proposed method includes a digital wireless data modulation scheme capable of achieving reliable operation in an indoor environment at rates of 10 Mbit/sec and above, primarily targeted for operation in newly released 5 GHz radio spectrum. The modulation will also be suitable for use in the 2.4 GHz ISM band. Due to the larger frequency spectrum available, the 5 GHz band provides the possibility of using more channels for microcellular coverage. Other frequency bands can be used provided they have adequate bandwidth for the modulation system.

To perform well in a radio channel, the waveforms should be designed so that the correlation of a waveform with a time-shifted version of itself is as small as possible for as much time shift, or "dispersion", as will be expected in the radio channel in which the system is operating. In the basic correlation equation (5) discussed earlier, this means that signal s(i) is replaced with a time shifted version of $w_n(i)$, or $w_n(i-t)$, where t is the time shift to be considered. The vector representing the correlation as a function of "t" is referred to as the autocorrelation function of the waveform. Autocorrelation functions for each waveform in the waveform set must be computed, and the functions must be jointly optimized such that no one waveform has bad performance in multipath (i.e., equivalent to high correlation sidelobes).

The optimization has been performed for length-16, length-8, and length-4 waveforms. Four optimal waveform sets were determined for the length-16 waveforms, and one optimal waveform set was determined for the length-8 and length-4 waveforms. The autocorrelation functions for these optimal sets goes to zero at time offsets of one and two chip time intervals from the t=0 position (ontime correlation).

The following steps are used to modulate waveform coded information in accordance with an embodiment of the present invention:

1. partition input data bits into units of length which correspond to the number of bits encoded per waveform interval;

2. select and set the sign of the waveform to be transmitted on the I channel;

3. select and set the sign of the waveform to be transmitted on the Q channel; and 4. shift the I and Q channel waveforms out over a waveform interval time "T" for a total of "Nc" chips where Nc=B+N+E, and B=the number of leading extension chips, N=the length of the basis waveforms, and E=the number of trailing extension chips. The "chip rate", or rate at which the waveform shift register must output bits is given by Nc/T where T is the waveform symbol transmission period (i.e., the waveform interval).

In another embodiment of the invention, a modified quadrature BPSK waveform encoding method is described. The disadvantage of current Quadrature-BPSK (QBPSK) encoding is the requirement of a coherent reference. However, the proposed modification, referred to as Orthogonal Quadrature-BPSK encoding, encodes the I and Q channels with independent, orthogonal waveform codes. Because the codes are orthogonal, the receiver does not need to generate a local carrier to demodulate the information.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Figure 2:
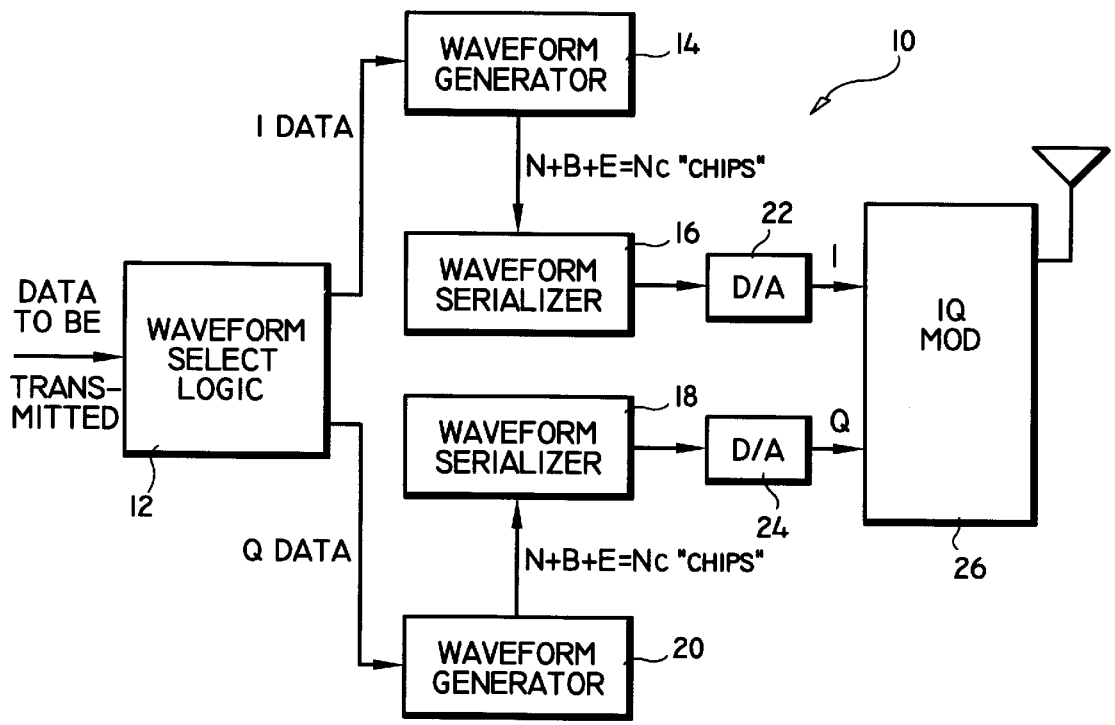
FIG. 2 is a block diagram of a radio transmitter of the prior art which can be used in accordance with the method of the present invention.

FIG. 2 shows a block diagram of typical waveform coding system applied in conjunction with a PSK radio transmitter 10. The following description of transmitter 10 is for illustrative purposes only. Other transmitters operating for the radio transmission of data may also be employed without departing from the scope of this disclosure. Transmitter 10 accepts input data through the waveform select logic 12, which produces I and Q outputs which typically drive D/A converters 22 and 24. The I and Q data output from waveform select logic 12 is then used to generate the I and Q waveforms which are fed into the D/A converters 22 and 24 respectively. Waveform generators 14 and 20 receive the I and Q data, respectively, and generate waveforms representative thereof. The Quadrature up converter 26 in turn normally low pass filters and translated these "baseband" IQ signals to the desired carrier frequency for transmission over the desired medium, in this context, a radio frequency channel.

In accordance with an embodiment of the invention, generators 14 and 20 add the extension bits B and E to the transmitted data, and then feed the output into waveform serializers 16 and 18, respectively. As shown the non-extended waveform N has B and E chips added thereto to produce Nc "chips", where B is the number of chips added to the beginning of waveform N and E is the number of chips appended to the end of waveform N.

In this system, the phase of an In-channel (I) and Quadrature channel (Q) mixer are modulated between (filtered) values of ±1. As such, the radio system is referred to as a "Binary Phase-Shift Keying" or BPSK based system. As mentioned earlier, other methods may be used to map waveform values onto a radio frequency carrier. Since BPSK is one of the simplest methods, it is preferable, and is used here for exemplary purposes. When the I and Q channels are modulated with independent binary waveforms, the radio is normally referred to as a QPSK based system.

The selection of the appropriate waveform codelength involves a tradeoff between system robustness and occupied bandwidth for a given data rate. Increasing the codelength improves robustness of the system, but either lowers the data rate in a fixed bandwidth or increases the system bandwidth for a fixed data rate. Typical waveform code lengths used in a practical system might be 16, 8 or 4. It is possible to find optimum, orthogonal sets of waveforms codes with these 2-power waveform lengths. Other example waveform code lengths are 11 and 13. With these lengths, a length-11 or length-13 Barker code may be used as the basis function from which a usable near-orthogonal waveform set may be derived.

Figure 1:
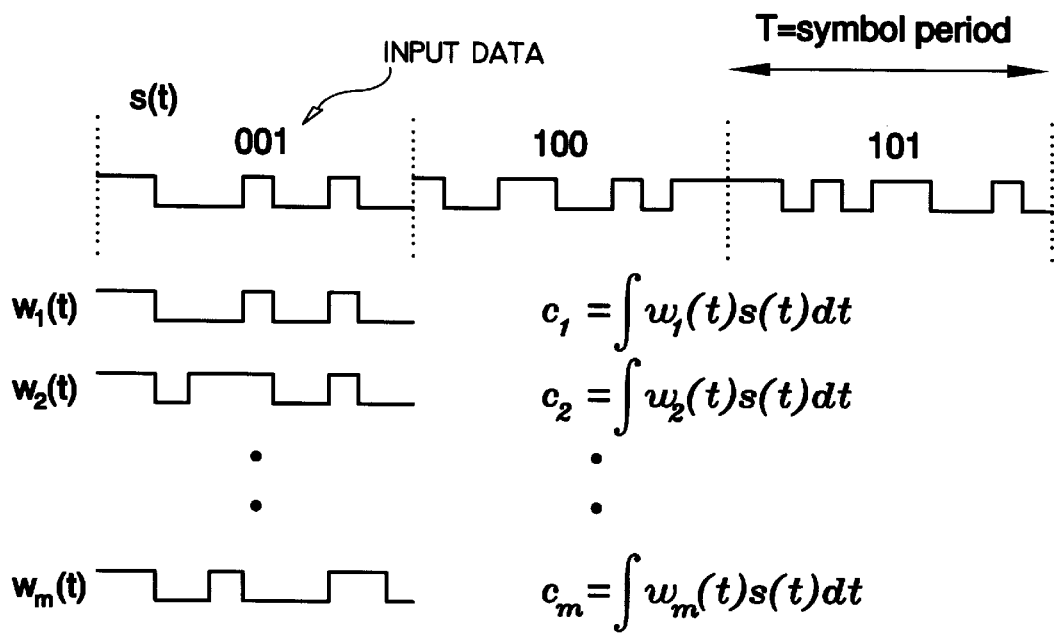
FIG. 1 is an example of a waveform coding sequence according to the prior art.

To modulate the input data, the waveform select logic 12 arranges data into units of length which correctly index the waveform set in use. For example, a length-16 waveform requires 4 bits to select the waveform, and an additional bit to select the sign of the waveform if BPSK encoding is being used. In this example, 5 bits would be coded per waveform and identical information is shifted out the waveform serializers 16 and 18. If the system is configured to run in QBPSK mode, then independently coded binary waveforms are shifted out the I and Q channels, and the waveform coding transmitter would be able to code 10 information bits per waveform interval, or symbol period T (FIG. 1).

Figure 3:
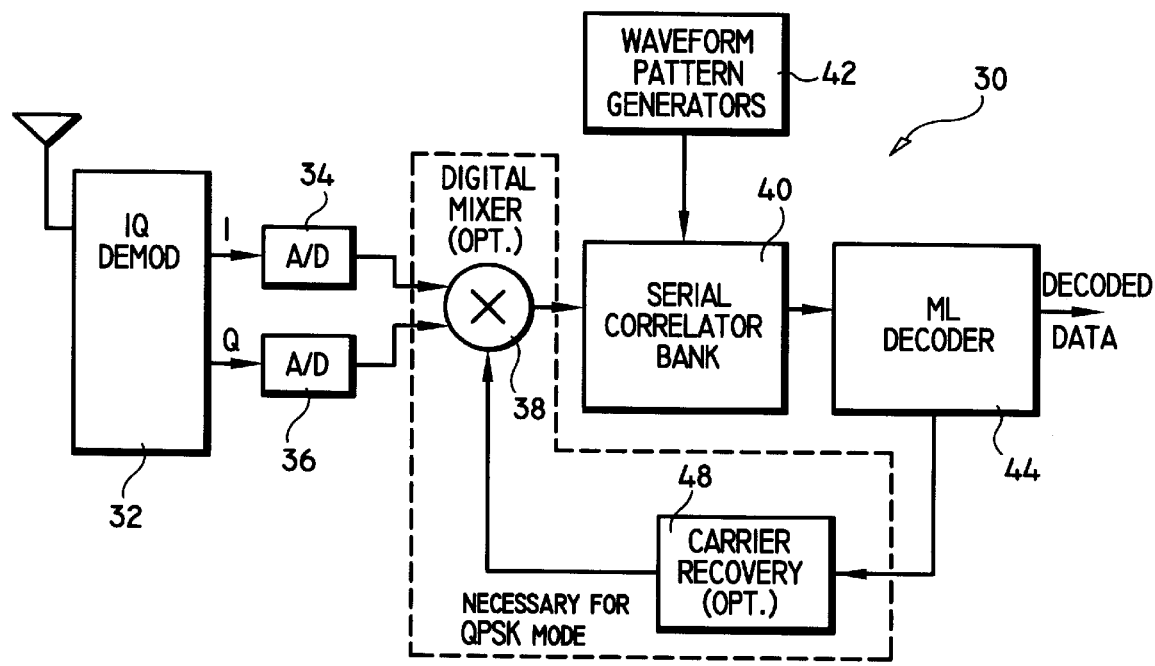
FIG. 3 is a block diagram of a radio receiver of the prior art which can be used in accordance with the method of the invention.

FIG. 3 is a block diagram of a coherent waveform coding receiver 30. The following description of receiver 30 is for illustrative purposes only. Other receivers operating for the purpose of the receiving radio transmission of data may also be employed without departing from the scope of this disclosure. The quadrature demodulator front end 32 translates the signal from a real carrier frequency to a complex baseband I/Q signal. The baseband I and Q signal is converted to a digital representation by A/D converters 34 and 36, respectively. Digital carrier recovery block 48 is responsible for generating the local phase reference (i.e., when working in QBPSK mode), and digital mixer 38 applies the phase correction to the IQ digital data stream on a sample-by-sample basis.

The digitized I/Q signal is processed by a bank of serial correlators or integrators 40, which correlate the received signal against a set of candidate waveforms for each waveform interval. The outputs of the serial correlators go into a decoder 44, which selects the largest correlation magnitude and outputs the data bits associated with that correlation. The serial correlation bank 40 gets its correlation patterns from a bank of waveform pattern generators 42 which output bit patterns corresponding to the waveforms used at the transmitter. The decoder 44 also implements waveform sign-bit decoding.

The serial correlator bank 40 comprises M complex serial correlators where M is equal to the number of waveforms in the basis set being used for transmission. As discussed earlier, M is normally equal to floor(log$_2$N), where N is the non-extended chip length of the waveforms being used at the transmitters. The complex outputs of the M serial correlators are processed by the decoder 44 at the end of the waveform correlation interval. The job of decoder 44 is to pick the correlation with the biggest magnitude and output data bits corresponding to that correlation. The decoder also decodes the sign bit of the waveform.

In accordance with an illustrative embodiment of the present invention, the channel waveforms are optimized for performance in a multipath channel through the application of extended waveform codes. The extended codes help compensate for multipath distortion generated as a result of multipath rays being summed into the dominant ray. This results in a increased multipath tolerance which significantly improves the multipath rejection capability.

Figure 4:
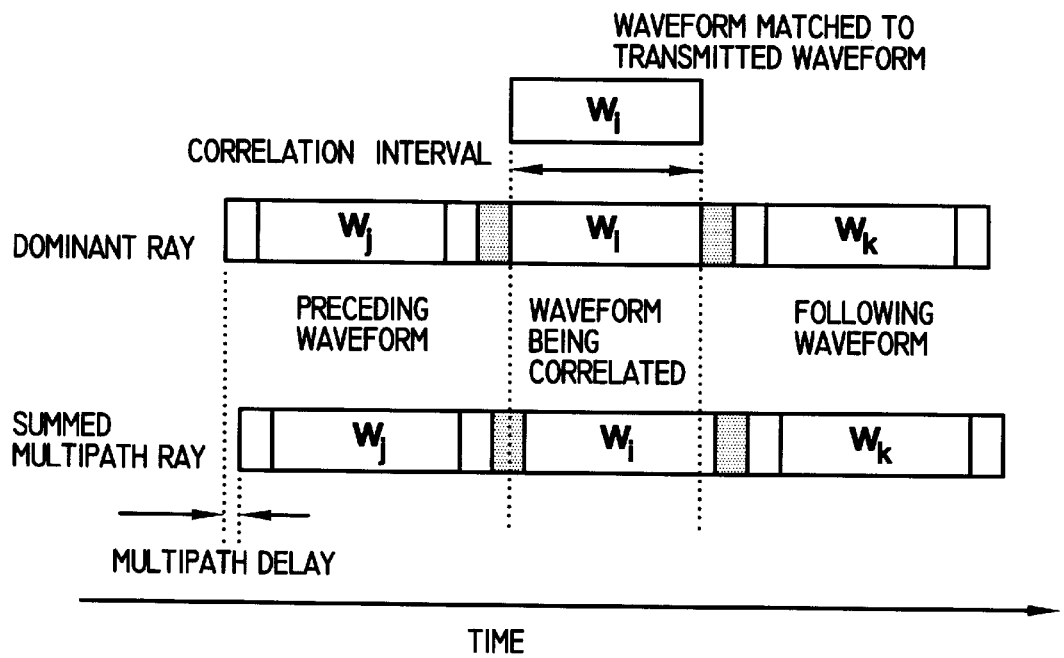
FIG. 4 is a schematic representation of the waveform extension method according to an embodiment of the invention.
Figure 5:
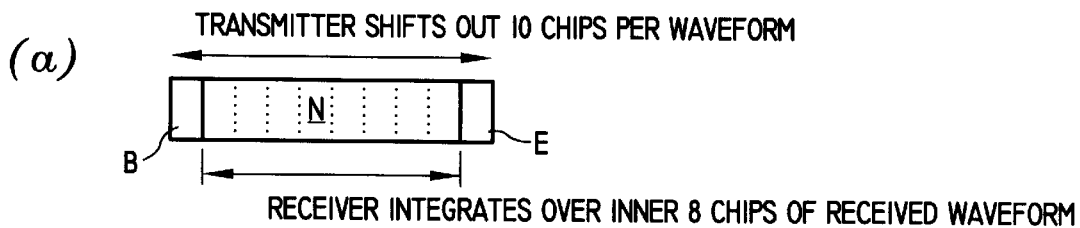
FIGS. 5a–5c are exemplary representations of the waveform extension method according to an embodiment of the invention.
Figure 5:
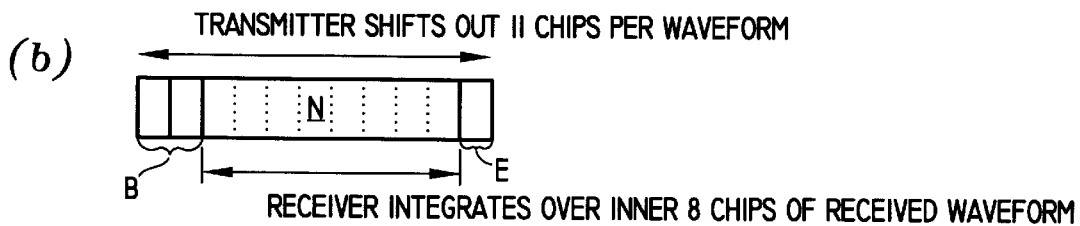
Figure 5:
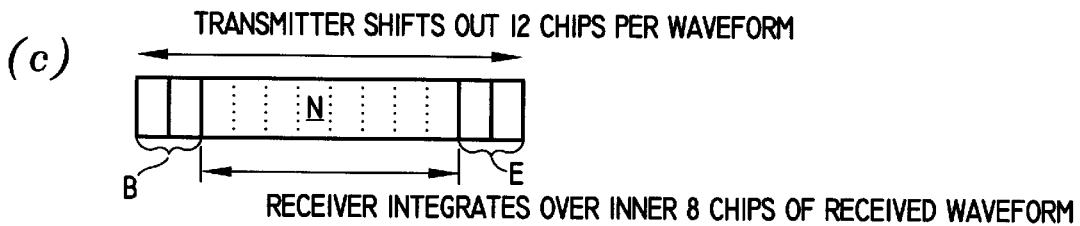

The concept of waveform extension and partial correlation at the receiver is shown in FIGS. 4 and 5. Referring to FIG. 4, the gray portion of the waveform corresponds to the extended part. When the multipath rays sum into the dominant ray, as long as the time shift (i.e., multipath delay) is less than or equal to the time duration of the extension chips, the autocorrelation function is completely controlled. As a result, the multipath rays add less distortion to the receive correlation when the waveform codes possess the optimum autocorrelation properties discussed earlier. As can be seen in FIG. 4, the multipath delay or time shift is less than the waveform time extension.

Referring to FIGS. 5a–c, several examples of a length-8 waveform are depicted to illustrate the chip extension and partial correlation at the receiver. Length-8 waveforms are being used here for illustrative purposes only. The same principles apply to other waveforms of varying length.

A straight forward waveform coding system would transmit eight chips per waveform interval and integrate across all eight chips at the receiver. In this example, N represents the length in chips of the non-extended eight chip waveform. However, when multipath resistant waveform coding is used, "B" chips are added to the beginning of the waveform and "E" chips are added at the end. FIG. 5a shows an example where B=1 and E=1. FIG. 5b shows the case when B=2 and E=1, and FIG. 5c shows the case when B=2and E=2. As shown in each of the above examples, the transmitter shifts out all of the chips per waveform, including the extensions. Thus, for the example of FIG. 5a, the transmitter shifts out 10 chips per waveform. For the examples of FIGS. 5b and 5c, the transmitter shifts out 11 and 12 chips per waveform, respectively. In each case, however, the receiver only integrates over the non-extended eight chip waveform interval (i.e., N). The number of B and E chips added can be varied according to the expected multipath time delay in the radio channel. However, the number of chips added should not exceed that necessary to provide the desired multipath tolerance.

It is possible in a non-multipath environment that the receiver can integrate over the full waveform interval, including the extension chips. This could improve signal-to-noise ratio at the output of the correlators, at the expense of sacrificing the multipath resistance built into the codes. A complex receiver structure could be envisioned which runs one decode stream using partial interval integration as diagrammed in FIG. 5, and another with full waveform interval integration. If a cyclic redundancy check (CRC) is embedded in the transmitted data, the decoded information with correct CRC would then be selected.

Figure 13:
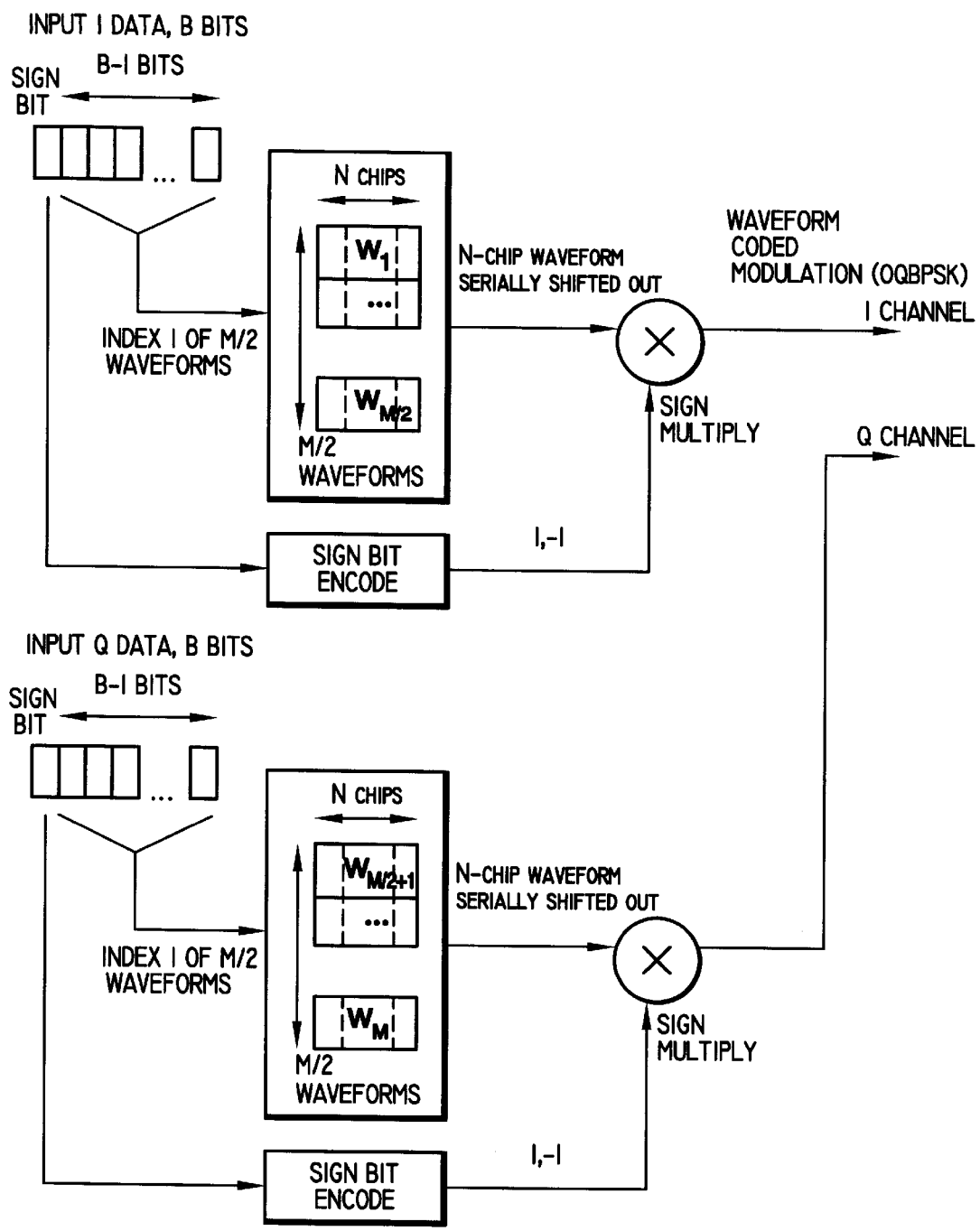
FIG. 13 is a block diagram representing the OQBPSK waveform encoding algorithm in accordance with an embodiment of the invention.

In another embodiment of the invention, a modified quadrature BPSK waveform encoding method is described. As mentioned earlier, the disadvantage of Quadrature-BPSK encoding is the requirement of a coherent phase reference. However, the proposed Orthogonal Quadrature-BPSK (OQBPSK) encoding method as shown in FIG. 13, encodes the I and Q channels with independent, orthogonal waveform codes. Because the codes are orthogonal, the receiver does not need to generate a coherent phase reference to demodulate the information.

Orthogonal Quadrature-BPSK encoding eliminates the need for the coherent reference at the price of encoding 2 less bits per waveform interval, or a total of 2*b. This encoding method packs more bits per unit time by splitting a length M orthogonal waveform set into 2 length (M/2) sets, and forming the output waveform by $$s = sign1 * \vec{w1} + j(sign2 * \vec{w2})$$

where $$\vec{w}$$

comes from the first length M/2 waveforms in the length M set, and $$\vec{w2}$$

from the second. This allows ((b−1)+1)*2=2b bits per waveform interval to be encoded (b−1 bits to select the waveform in each set, plus a sign on the waveform). At the receiver, the waveforms can be decoded without a phase reference since waveforms $$\vec{w}$$

and $$\vec{w2}$$

are orthogonal to each other.

To decode the orthogonal Quadrature-BPSK encoded modulation, the received signal is correlated against the two length M/2 sets of waveforms used at the transmitter. The maximum correlation magnitude from the first length M/2 waveform set corresponds to the data encoded on the I channel, and the maximum correlation magnitude from the second length M/2 waveform set corresponds to the data encoded on the Q channel. Sign bits are decoded independently from each of these two maximum correlation results in the same manner as the BPSK decoder.

Optimal Waveform Sets

As described earlier, using the method of the invention, four (4) sets of length-16 codes were found which exhibit optimal cross correlation characteristics. One of the four sets is given here for example:

[1, 1, 1, −1, −1, 1, −1, −1, −1, −1, 1, −1, 1, −1, −1, −1]
[−1, −1, −1, 1, 1, −1, 1, 1, −1, −1, 1, −1, 1, −1, −1, −1]
[−1, −1, −1, 1, −1, 1, −1, −1, 1, 1, −1, 1, 1, −1, −1, −1]
[1, 1, 1, −1, 1, −1, 1, 1, 1, 1, −1, 1, 1, −1, −1, −1]
[−1, −1, 1, −1, 1, −1, −1, −1, 1, 1, 1, −1, −1, 1, −1, −1]

[1, 1, −1, 1, −1, 1, 1, 1, 1, 1, 1, −1, −1, 1, −1, −1]
[1, 1, −1, 1, 1, −1, −1, −1, −1, −1, −1, 1, −1, 1, −1, −1]
[−1, −1, 1, −1, −1, 1, 1, 1, −1, −1, −1, 1, −1, 1, −1, −1]
[−1, 1, −1, −1, 1, 1, 1, −1, 1, −1, −1, −1, −1, −1, 1, −1]
[1, −1, 1, 1, −1, −1, −1, 1, 1, −1, −1, −1, −1, −1, 1, −1]
[1, −1, 1, 1, 1, 1, 1, −1, −1, 1, 1, 1, −1, −1, 1, −1]
[−1, 1, −1, −1, −1, −1, −1, 1, −1, 1, 1, 1, −1, −1, 1, −1]
[1, −1, −1, −1, −1, −1, 1, −1, −1, 1, −1, −1, 1, 1, 1, −1]
[−1, 1, 1, 1, 1, 1, −1, 1, −1, 1, −1, −1, 1, 1, 1, −1]
[−1, 1, 1, 1, −1, −1, 1, −1, 1, −1, 1, 1, 1, 1, 1, −1]
[1, −1, −1, −1, 1, 1, −1, 1, 1, −1, 1, 1, 1, 1, 1, −1]

Another way to specify the codes uses hex representation, wherein a binary "1" corresponds to a waveform value of 1, and a binary "0" corresponds to a waveform value of −1. An example of the hex representation of the optimal sets are:

Set 16-1:

[6ca0, 93a0, 9c50, 6350, a06c, 5f6c, 509c, af9c, c60a, 390a, 36fa, c9fa, ac6, f5c6, fa36, 536]

Set 16-2:

[ac60, 5360, 5c90, a390, 60ac, 9fac, 905c, 6f5c, 6ca, f9ca, f63a, 93a, ca06, 3506, 3af6, 3af6,c5f6]

Set 16-3:

[e428, 1b28, 14d8, ebd8, 28e4, d7e4, d814, 2714, 4e82, b182, be72, 4172, 824e, 7d4e, 72be, 8dbe]

Set 16-4:

[24e8, dbe8, d418, 2b18, e824, 1724, 18d4, e7d4, 8e42, 7142, 7eb2, 81b b2, 428e, bd8e, b27e, 4d7e]

These lists are only one possible representation of the optimal codes. The values in the sets can be ones-complemented, or re-ordered without affecting the autocorrelation properties of the codes.

Figure 6:
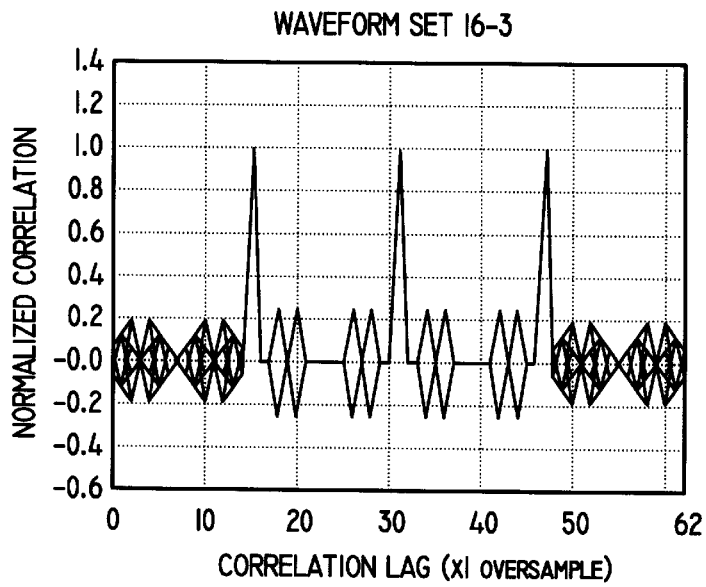
FIG. 6 is a graphical representation of the autocorrelation characteristics of an optimal waveform set for a length-16 waveform according to an embodiment of the invention.

Some insight into the optimality of the sets can be gained by examining the correlation functions of the data waveforms against a sequence of three data waveforms which are equal to the center data waveform being correlated (the resulting function is a kind of autocorrelation). The plot shown in FIG. 6 shows the autocorrelation for all waveforms in the 16-3 set (i.e., one optimal set). As shown, the optimal set exhibits good properties since the correlation goes to zero for ±two full chips adjacent to the centered correlation. This will enable the waveforms to better reject multipath interference which arrives in the time interval of ±2 chips, particularly when the low correlation is "forced" by either a one or two chip extension of the waveforms.

The autocorrelation shown in FIG. 6 is only valid when the previous waveform, the current waveform, and the next waveform are all the same (in addition to the waveform sign also being the same). When the waveforms adjacent to the waveform being integrated at the receiver have different values and different signs, the correlation function may not go to zero at one and two chip shifts from the center as the autocorrelation functions of the individual waveforms do. To force the correlation function to maintain this optimum low correlation property at one and two chip time shifts, the waveforms are extended by one or two chips. Given a waveform comprising chips indexed w(0) through w(N−1):

$$\vec{w} = [w(0), w(1), \ldots w(N-1)]$$

a one-chip cyclically extended waveform is given by the sequence $$\vec{w1} = [w(N-1), w(0), w(1)\ldots w(N-1)w(0)]$$

and a two-chip cyclically extended waveform is given by $$\vec{w2} = [w(N-2), w(N-1), w(0), w(1)\ldots w(N-1), w(0), w(1)]$$

In general, a cyclically extended waveform with a leading B chip extension and a trailing E chip extension is given by $$wBE = [w(N-B), \ldots w(N-1), w(0), w(1)\ldots w(N-1), w(0), \ldots w(E-1)]$$

Other extension chips values, beside those given in these cyclic extension examples, may be appropriate for waveform sets with different autocorrelation properties.

As discussed earlier with reference to FIG. 5, the waveform is only integrated by the receiver over the non-extended interval, that is, w(0) . . . w(N−1). As a result, the integrated waveform is less susceptible to multipath interference with the time delays less than or equal to the extension chip time duration.

Length-11 or Length-13 Codes

A good candidate for length-11 codes is a waveform set based on cyclically rotated Barker patterns. The Barker patterns are:

length-11:

[1, 1, 1, −1, −1, −1, 1, −1, −1, 1, −1]=[712]

length-13:

[1, 1, 1, 1, 1, −1, −1, 1, 1, −1, 1, −1, 1]=[1f35]

In application of these codes to waveform coding, 8 waveforms are selected (i.e., M=8) from circularly shifted versions of the basic Barker code patterns. This allows 3 bits to be encoded per waveform, plus one sign bit. These codes are not orthogonal, but are near-orthogonal and usable in a waveform coding system. An example set using the length-11 waveforms is:

[1, 1, 1, −1, −1, −1, 1, −1, −1, 1, −1]
[1, −1, −1, −1, 1, −1, −1, 1, −1, 1, 1]
[−1, −1, 1, −1, −1, 1, −1, 1, 1, 1, −1]
[−1, 1, −1, −1, 1, −1, 1, 1, 1, −1, −1]
[1, −1, −1, 1, −1, 1, 1, 1, −1, −1, −1]
[−1, −1, 1, −1, 1, 1, 1, −1, −1, −1, 1]
[1, −1, 1, 1, 1, −1, −1, −1, 1, −1, −1]
[−1, 1, 1, 1, −1, −1, −1, 1, −1, −1, 1]

The equivalent hex representation is set 11-1:

[712, 44b, 12e, 25c, 4b8, 171, 5c4, 389]

The Barker codes provide a reasonable basis set for a length-11 system. They are not orthogonal, but the autocorrelation functions do possess constant cyclic-shift invariant attenuation so a workable system can be built using cyclically shifted Barker codes for the length-11 waveform system. Length-13 Barker codes possess this same cyclic-shift invariant attenuation, and are also a reasonable candidate for use if more coding gain is needed than that provided by the length-11 codes.

Figure 7:
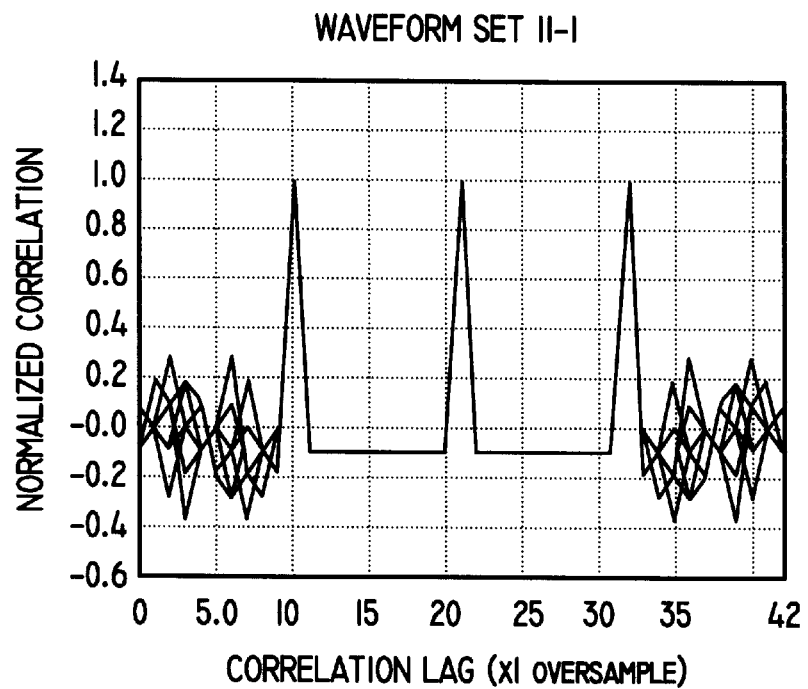
FIG. 7 is a graphical representation of the autocorrelation characteristics of an optimal waveform set for a length-11 waveform according to an embodiment of the invention.

FIG. 7 is a graphical representation of the autocorrelation function for the 11-1 waveform set.

Length-8 Codes

Only one optimal length-8 code was found, and it is as follows:

[−1, 1, −1, −1, 1, −1, −1, −1]
[1, −1, 1, 1, 1, −1, −1, −1]
[1, −1, −1, −1, −1, 1, −1, −1]
[−1, 1, 1, 1, −1, 1, −1, −1]
[1, 1, 1, −1, −1, −1, 1, −1]
[−1, −1, −1, 1, −1, −1, 1, −1]
[−1, −1, 1, −1, 1, 1, 1, −1]
[1, 1, −1, 1, 1, 1, 1, −1]

The equivalent hex representation is:

Set 8-1:

[48, b8, 84, 74, e2, 12, 2e, de]

Figure 8:
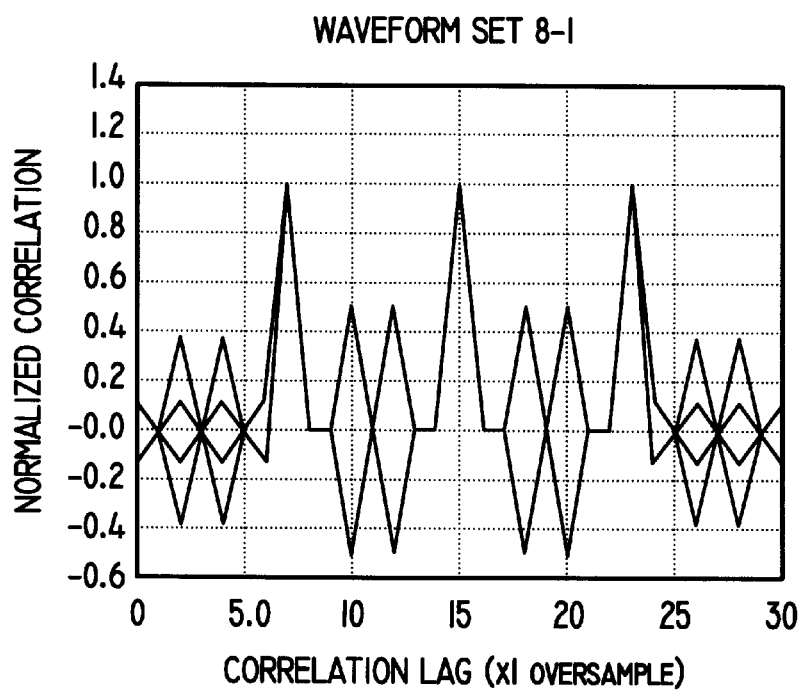
FIG. 8 is a graphical representation of the autocorrelation characteristics of an optimal waveform set for a length-8 waveform according to an embodiment of the invention.

The autocorrelation function shown in FIG. 8 for the 8-1 waveform set appears very similar to that shown for the length-16 waveform shown in FIG. 6.

Length-4 Codes

Only one optimal length-4 code was found, and it is as follows:

[−1, 1, 1, 1]
[1, 1, 1, −1]
[−1, 1, −1, −1]
[−1, −1, 1, −1]

The equivalent hex representation is:

Set 4-1

[7, e, 4, 2]

Figure 9:
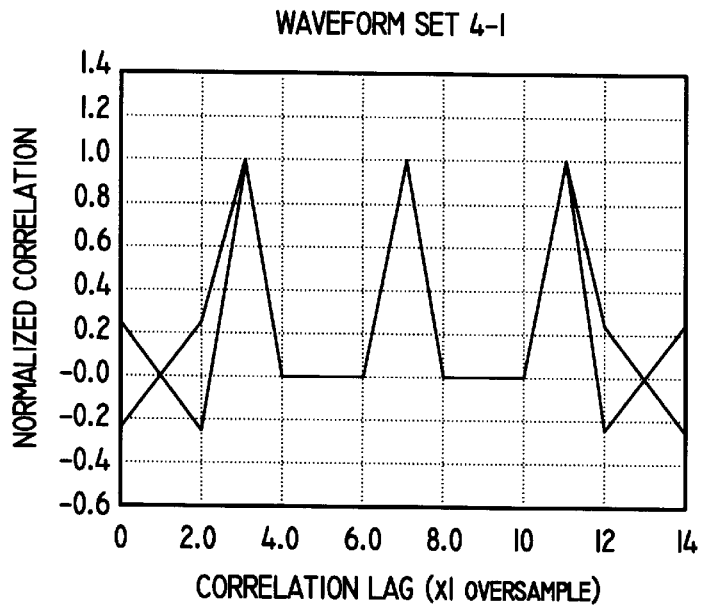
FIG. 9 is a graphical representation of the autocorrelation characteristics of an optimal waveform set for a length-4 waveform according to an embodiment of the invention.
Figure 10:
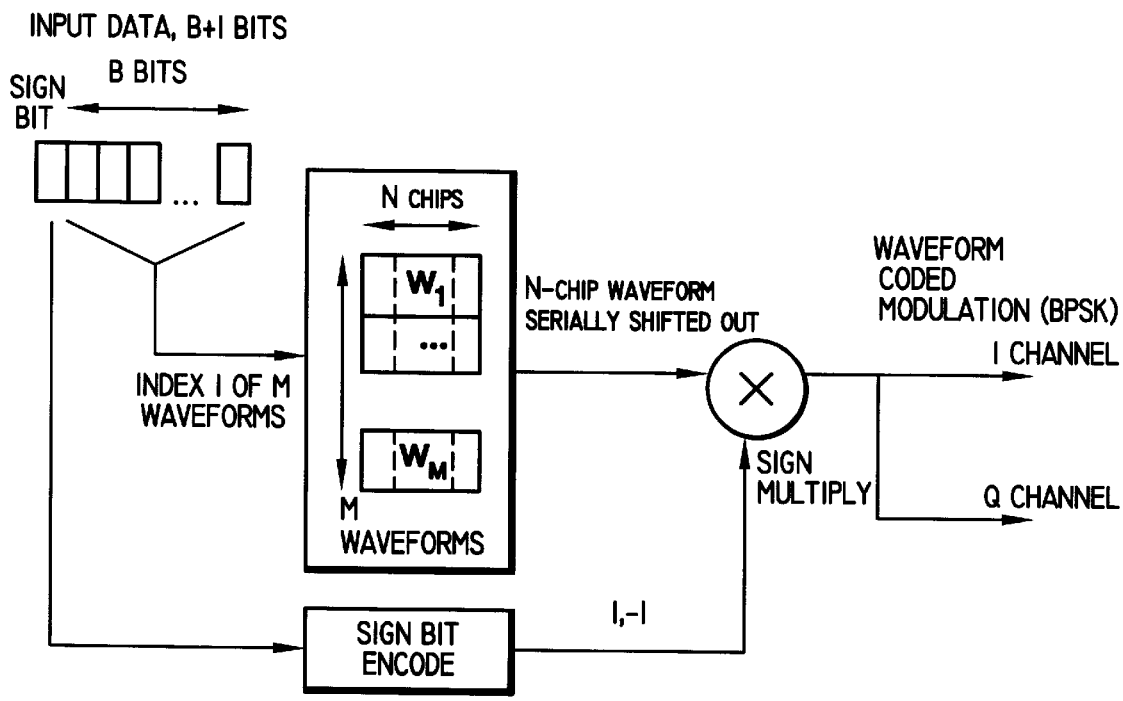
FIG. 10 is a block diagram representing the BPSK waveform encoding algorithm.
Figure 11:
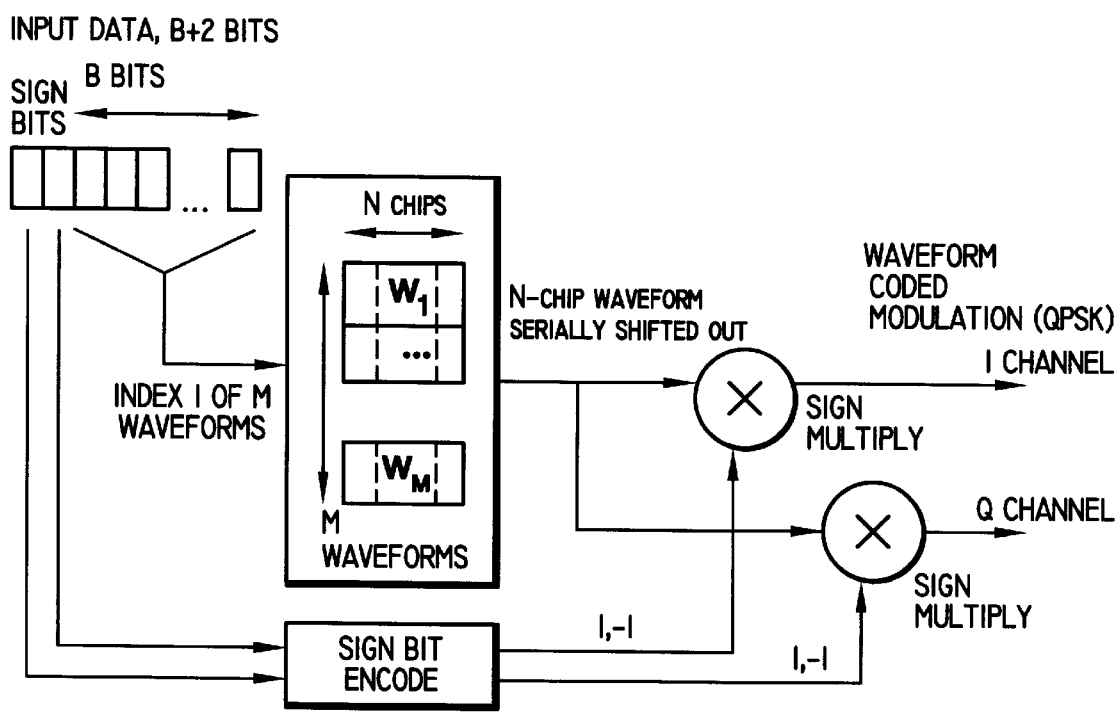
FIG. 11 is a block diagram representing the QPSK waveform encoding algorithm.
Figure 12:
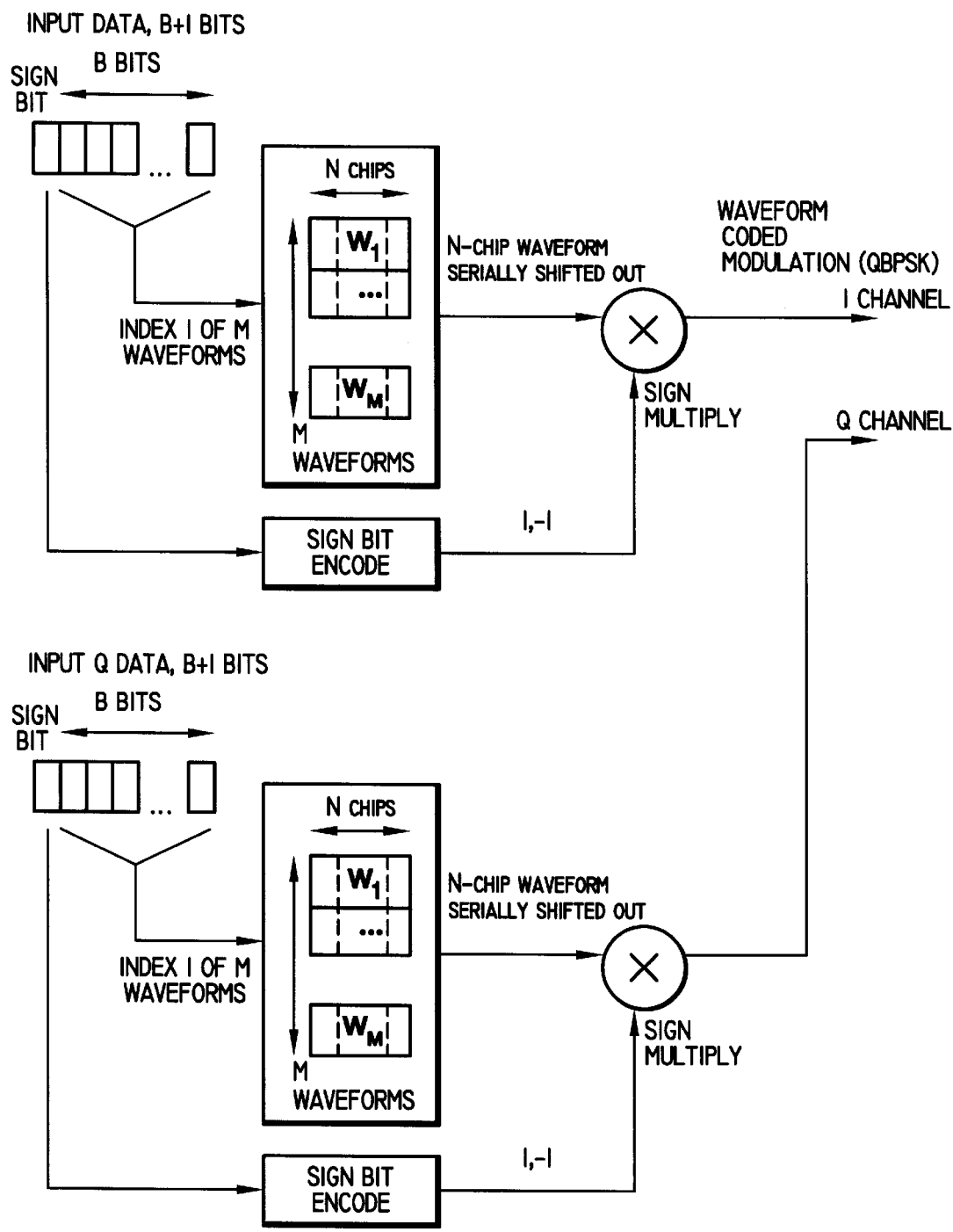
FIG. 12 is a block diagram representing the QBPSK waveform encoding algorithm.

FIG. 9 shows the autocorrelation representation of the 4-1 waveform set.

The following tables (1–2) show examples of data rates achievable with varying transmit encode mode, waveform length N and extension chips B and E at fixed chip rates of 11 Mchips/sec, and 22 Mchips/sec which are integer multiples of the IEEE 802.11 wireless LAN DS-SS system. The 11 Mchip/sec table (i.e. table 1) contains examples with different numbers of cyclic extension bits B and E (0, 1, and 2) for the different data modes and waveform lengths which can benefit from waveform extension (i.e., waveform sets with optimal autocorrelation properties). Notice that the total extra chips added to a waveform is B+E. The 22 Mchips/sec (i.e., table 2) also contains examples with different numbers of waveform extension chips B and E (0, 1, and 2) for the different data modes and waveform lengths which can benefit from waveform extension (i.e., waveform sets with optimal autocorrelation properties).

TABLE 1

Data Rates at 11 Mchips/sec

| Chip Rate (Mchip/sec) | Data Mode | Ext. chips B | Ext. chips E | bits/ sym | Waveform Length | Symbol Rate (Msymbol/ sec) | Date Rate (Mbit/sec) |
| --- | --- | --- | --- | --- | --- | --- | --- |
| 11 | BPSK | 0 | 0 | 5 | 16 | 0.6875 | 3.4375 |
| 11 | QPSK | 1 | 1 | 5 | 8 | 1.1 | 5.5 |
| 11 | OQBPSK | 2 | 1 | 6 | 8 | 1.0 | 6.0 |
| 11 | QBPSK | 2 | 2 | 6 | 4 | 1.375 | 8.25 |

TABLE 2

Data rates at 22 Mchips/sec

| Chip Rate (Mchip/sec) | Data Mode | Ext. chips B | Ext. chips E | bits/ sym | Waveform Length | Symbol Rate (M symbol/ sec) | Data Rate (Mbit/sec) |
|---|---|---|---|---|---|---|---|
| 22 | BPSK | 0 | 0 | 5 | 16 | 1.375 | 6.875 |
| 22 | QPSK | 1 | 1 | 6 | 16 | 1.222 | 7.333 |
| 22 | OQBPSK | 2 | 1 | 8 | 16 | 1.158 | 9.263 |
| 22 | QBPSK | 2 | 2 | 10 | 16 | 1.1 | 11.0 |

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for multipath waveform coding comprising the steps of:

adding at least one chip extension to an input waveform;

transmitting the waveform over a radio channel; and matching an inner part of the transmitted waveform with the input waveform.

2. The method according to claim 1, wherein said step of adding is performed at a transmitter during modulation of the waveform to be transmitted.

3. The method according to claim 1, wherein said step of matching is performed at a receiver during demodulation of the transmitted waveform.

4. The method according to claim 1, wherein said step of adding is performed in response to an expected multipath time shift in a radio channel being used for transmitting the waveform.

5. The method according to claim 1, wherein said step of adding can be performed to add the at least one chip extension to the beginning or end of the input waveform.

6. The method according to claim 1, wherein the input waveform to which at least one chip extension is added is an optimally designed waveform set.

7. The method according to claim 2, wherein said step of transmitting the extended waveform further comprises the step of shifting an I and Q channel waveform generated during modulation out over a waveform interval.

8. The method according to claim 7, wherein said step of shifting is performed over the waveform interval for a total of Nc chips equal to the length of the input waveform plus the added at least one chip extension.

9. A method for modulating waveform coded information comprising the steps of:

partitioning input data bits into units of length corresponding to the number of bits encoded per waveform;

selecting and setting a sign of the waveform to be transmitted on an I channel;

selecting and setting a sign of the waveform to be transmitted on a Q channel;

assigning chip extensions to the waveform to be transmitted; and shifting the I and Q channel waveforms out over a waveform interval time for a total number of chips equal to the length of the waveform to be transmitted and the chip extensions assigned to the waveform.

\* \* \* \* \*